Dec. 21, 1965  G. ALFIERI  3,224,455
THREE-WAY SERVO DEVIATOR FOR PRESSURIZED
FLUID SYSTEMS AND MORE SPECIFICALLY FOR
PNEUMATIC BRAKING SYSTEMS
Filed Nov. 30, 1962

INVENTOR.
Giuseppe Alfieri
BY
Carl C. Batz

United States Patent Office 3,224,455
Patented Dec. 21, 1965

3,224,455
THREE-WAY SERVO DEVIATOR FOR PRESSURIZED FLUID SYSTEMS AND MORE SPECIFICALLY FOR PNEUMATIC BRAKING SYSTEMS
Giuseppe Alfieri, Milan, Italy, assignor to Fabbrica Italiana Magneti Marelli S.p.A., Milan, Italy, a corporation of Italy
Filed Nov. 30, 1962, Ser. No. 241,236
Claims priority, application Italy, Dec. 5, 1961, 21,867/61
5 Claims. (Cl. 137—113)

This invention relates to a three way servo deviator for pressurized fluid systems, and more specifically to pneumatic braking systems.

With specific but not exclusive reference to pneumatic braking systems—where the invention finds advantageous but not necessarily exclusive application—automatic flow deviators, also known as dual check valves are used. These devices make it possible to alternatively supply a single circuit with either one or the other of two sources of fluid under pressure. However, operation of the said known devices is not fully reliable, particularly in case where the final circuit is supplied with very low pressures as may occur in adjustable pressure braking systems. Moreover, said known devices are subject to leakages that may give rise to troubles and otherwise adversely affect the operation of the system.

An object of the invention is to provide a fluid servo-deviator the operation of which is always reliable, regardless of the supply pressure called for by the system and which gives the maximum degree of safety against leakages and fluid losses.

The servo-deviator according to this invention has a hollow body equipped with fittings for connection to the system and to one or the other of two pressurized fluid supply sources by means of a piston in said hollow body, and is characterized in that the chamber in which the piston or commutator operates, has (near its central portion) two annular seats holding seal gaskets cooperating with said piston.

According to the invention the chamber wherein the piston operates provides a cylindrical portion in its central part, connected to the system by the relevant fittings, said cylindrical portion being limited by two annular gaskets for the piston or commutator.

In case it is necessary to insure engagement of the commutator piston with one of the two seats (this necessity may arise under normal operating conditions, when both pressure supply sources are efficient, and have equal pressures), the piston may be a differential type piston so that it may take on the desired position from time to time, as required. Obviously, in this case the sealing gaskets have different diameters to engage with the different diameters of the said differential piston.

The invention is described in the following specification and illustrated in the attached drawing, which shows, by way of example, some forms of the servo deviator.

In the drawings.

In both figures like parts are identified by like numbers.

Figure 1:
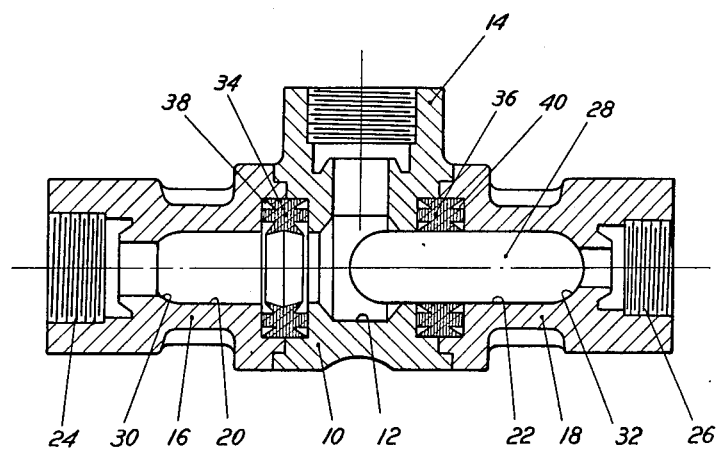
FIG. 1 is a horizontal cross sectional view of the servo deviator in accordance with an embodiment of the invention.

The servo-deviator illustrated consists of a tubular body 10, having, in its mid section, a fitting for connection to the system, not shown in the figure.

The two ends of the body 10 are suitably counterbored to engage the ends of the two supplementary bodies 16 and 18 having internal half chambers 20 and 22, said chambers being connected by means of fittings 24 and 26 with the pressurized fluid sources, not indicated in the drawing. Said fittings are coaxial with their respective chambers, which are also co-axial with respect to each other. It is evident from the drawing that the two complementary bodies 16 and 18 are opposite each other, and suitably held against body 10.

The half chambers 20 and 22 form a cylinder to house movable piston 28, the ends of which piston are conveniently rounded so as to seat with the concave ends 30 and 32 towards the ends of chambers 20 and 22.

Seal off between chambers 12, 20 and 22 and piston 28 is insured by ring gaskets 34 and 36, which are housed in grooves 38 and 40 in he ends of complementary bodies 16 and 18.

In the example shown, the grooves 38 and 40 are so located that the mating surfaces of central body 10 and complementary bodies 16 and 18 coincide substantially with the middle of said grooves, as shown. In addition to insuring seal off between piston 28 and chambers 12, 20 and 22, the gaskets also constitute a seal between said chambers and the atmosphere.

Figure 2:
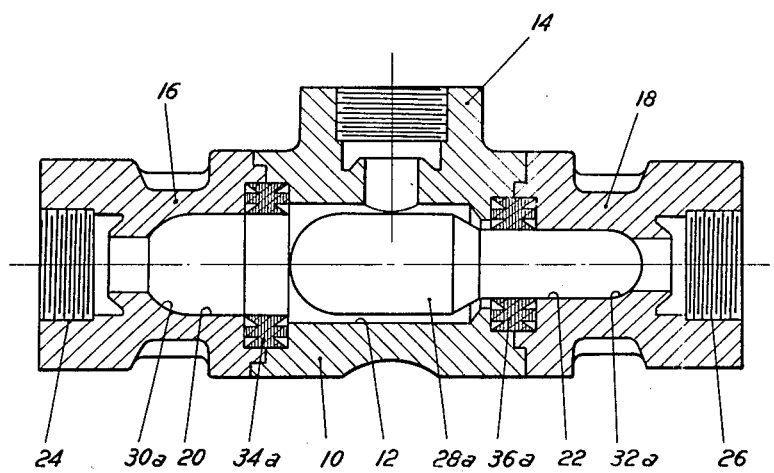
FIG. 2 is a horizontal cross sectional view of a modified form of the embodiment of FIG. 1.

The servo deviator shown in FIG. 2 has a differential piston operator 28a, so designed as to engage either one of the two seats 30a and 32a. This in case the pressure sources connected to fittings 24 and 26 are of equal value, with their respective fluids having equal pressure, and it is desirable to preset the predominance of one cycle over the other.

In this version, the smaller end of piston or commutator 28a is continuously urged against seat or port 32a by the fluid under pressure. Obviously, in this version, gaskets 34a and 36a have different diameters so as to suitably engage the two different diameters of the piston.

Obviously, when pressure is established in either one of chambers 20 and 22, piston 28a is urged against the seat of the chamber opposite the pressurized chamber. From this latter chamber, the fluid passes into the system through fitting 14. When, for any reason the supply fluid is sent simultaneously to chambers 20 and 22, the differing cross sections of piston 28a insures prevalence of the desired supply circuit, connected to fitting 24, with respect to the circuit connected to fitting 26.

Gaskets 34 and 36, as previously stated, are dual type, to ensure a tightness and leak proof operation under all conditions.

Having thus described the invention it will be apparent to those of ordinary skill in the art to which the invention pertains, that various modifications and changes may be made in the illustrated embodiments without departing from either the spirit or scope of the invention.

I claim:

1. A three way servo deviator for pressurized fluid systems, comprising a hollow body having connection fittings adapted to lead to a system and to two pressurized fluid supply sources, stop means within said body on opposite sides of said system fitting, a piston in said body and movable in response to pressure from one of said source fittings to one position in which fluid from said one source fitting is in communication with said system fitting and movable in response to pressure from the other of said source fittings to another position in which fluid from said other source fitting is in communication with said system fitting, and a pair of sealing gaskets fixedly mounted within said body on opposite sides of said system fitting, the length of said piston being greater than the distance between a stop means and the adjacent gasket so that one of said gaskets slidably engages the exterior surface of said piston when it is in said one position and the other of said gaskets engages said piston when it is in said other position, said gaskets being spaced apart a distance less than the length of said piston so that the piston in moving from one to the other position is always engaged by one or the other of said gaskets.

2. A servo deviator as set forth in claim 1 in which said gaskets are provided at their points of contact with said piston with a double lip structure which resiliently engages the exterior surface of said piston and in which said piston has rounded ends to facilitate its entrance into engagement with said sealing gaskets.

3. A three way servo deviator for pressurized fluid systems, comprising a hollow body having a centrally located opening adapted to lead to a system and having an end opening adapted to lead to one source of pressurized fluid and having an opening at its other end adapted to lead to another source of pressurized fluid, the hollow of said body providing a chamber in communication with each of said openings, a piston within said chamber, said piston having rounded ends, said chamber having rounded ends to fit said piston, said piston being movable to a position at one end of said body in which it engages the edges of one of said end openings to close the same, and its end seats against a rounded end of said chamber, a gasket held by said body in said one end and engaging said piston when it is in said position, said piston being movable to another position at the other end of said body in which it engages the edges of the opening at said other end of the body to close the opening, and a gasket held by said body in said other end and engaging said piston when it is in said other position, the length of the piston being such that when it engages one of the chamber rounded ends it is spaced from the gasket at said other end.

4. A three way servo deviator for pressurized fluid systems, comprising a hollow body having a centrally located opening adapted to lead to a system and having an end opening in one end adapted to lead to one source of pressurized fluid and having an opening at its other end adapted to lead to another source of pressurized fluid, the hollow of said body providing a chamber in communication with each of said openings, a piston within in said chamber, said piston being movable to a position at one end of said body in which it engages the edges of one of said end openings in abutting relationship to close the same, a gasket held by said body in said one end and engaging said piston when it is in said position, said piston being movable to another position at the other end of said body in which it engages the edges of the opening at said other end of the body in abutting relationship to close the opening, and a gasket held by said body in said outer end and engaging said piston when it is in said other position, said piston being of greater cross section at its one end than it is at its other end, one of said gaskets being larger and engaging said end of larger cross section and the other of said gaskets being smaller and engaging said other end of said piston, whereby the deviator favors fluid entering through said one end, the length of said piston being such that when it is in one of said positions at one end of said body it is spaced from the gasket at said other end of said body and being greater than the distance from said one end opening to the adjacent gasket.

5. A servo deviator as set forth in claim 1 in which there is provided in the hollow of said body a pair of spaced annular grooves in which said gaskets are contained.

References Cited by the Examiner

UNITED STATES PATENTS

| | | | |
|---|---|---|---|
| 1,529,384 | 3/1925 | Adams | 137—112 |
| 1,795,386 | 3/1931 | Beebe | 137—516.25 X |
| 1,965,273 | 7/1934 | Wilson | 277—206.1 |
| 2,272,304 | 2/1942 | Lohman | 137—112 X |
| 2,358,228 | 9/1944 | Hoof | 137—516.25 X |
| 2,445,505 | 7/1948 | Ashton | 137—113 |
| 2,551,045 | 5/1951 | Parker | 137—113 |
| 2,990,843 | 7/1961 | Smith | 137—112 X |
| 3,052,478 | 9/1962 | Horvereid | 277—209 |

ISADOR WEIL, *Primary Examiner.*

MARTIN P. SCHWADRON, *Examiner.*